By Norton Lesser.
Attorney

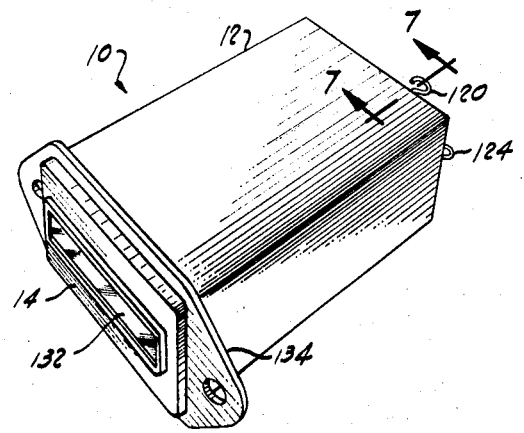
FIG. 1.
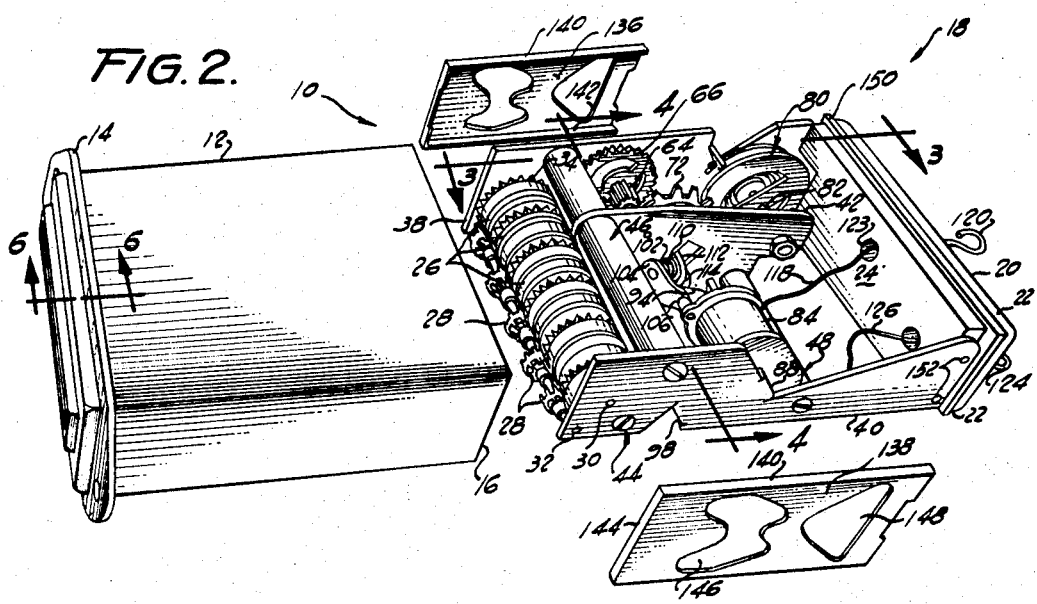
FIG. 2.
FIG. 3.
INVENTORS
Arthur J. Little.
William R. Moyer.
By Norton Lesser
Attorney INVENTORS
Arthur J. Little.
William R. Mayer.

United States Patent Office 3,418,802
Patented Dec. 31, 1968

3,418,802
HOUR METER
Arthur J. Little, Springfield, and William R. Mayer, Rochester, Ill., assignors to Stewart-Warner Corporation, Chicago, Ill., a corporation of Virginia
Filed Apr. 4, 1966, Ser. No. 539,882
9 Claims. (Cl. 58—145)

ABSTRACT OF THE DISCLOSURE

The following specification describes a sealed electrically operated hour meter having a plurality of spaced parallel plates for journalling all rotating parts along parallel axes with the plates being supported in a housing on damping pads and the first odometer wheel being driven at a visually observable rate from the drive wheel through a single transfer pinion.

This invention relates in general to hour meters and more particularly to a vibration resistant hermetically sealed hour meter together with an improved shaft orientation and drive apparatus for an hour meter.

Hour meters employ delicate clock mechanisms which are utilized on various types of machines for ascertaining machine operating time. The environment in which the clock mechanisms are used corresponds to that in which the machinery is employed and this environment often requires that the hour meter be protected both from atmospheric and vibrational effects.

It is therefore an objective of the present invention to provide an hour meter which is hermetically sealed and protected from ambient vibrational forces.

Conventional clock mechanisms are used in hour meters, but the mechanisms are designed to drive coaxial hour, minute, and second hands about a central horizontal axis. The shafts and gears of the clock mechanism are therefore oriented along related axes for convenience in transmitting movement to the clock hands.

Since the odometer wheels of an hour meter are most conveniently arranged on a shaft normal to the shafts of the clock mechanism with the first driven odometer wheel offset from the central horizontal axis of the clock, transmission to the first odometer wheel usually requires additional gearing, together with supporting structure. This is avoided in the present invention by arranging the shafts of the hour meter in parallel alignment.

In addition, since an intermediate gear such as a 1 r.p.m. wheel between the idler wheel and the drive wheel was used in prior hour meters, a gear ratio resulted, which required an unnecessarily heavy mainspring to operate the drive wheel. By eliminating the intermediate gear and coupling the idler wheel directly between the drive wheel and the escape wheel, a smaller mainspring can be used and the power and size of the magnet required to wind the mainspring and the number of gears are reduced.

It is therefore an object of the present invention to provide a simplified and more economical hour meter.

It is another object of the present invention to reduce the power requirements for winding the clock mechanism of an hour meter.

It is still another object of the present invention to provide an improved magnetic structure for use in winding the clock mechanism of an hour meter.

Other objects and features of the present invention will become apparent upon examination of the following specification and claims, together with the drawings, wherein:

FIG. 1 is a perspective view of an hour meter incorporating the principles of the present invention;

FIG. 2 is an exploded perspective view of the hour meter shown in FIG. 1 and illustrating the bottom of the hour meter for clarity in comprehending the parts relationship;

FIG. 3 is a sectional view taken along the line 3—3 in FIG. 2;

Figure 4:
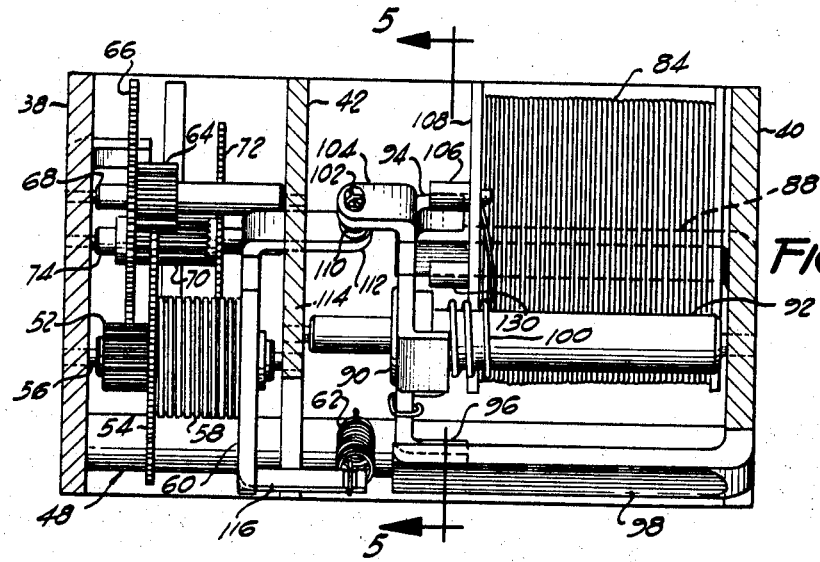
FIG. 4 is a sectional view taken along the line 4—4 in FIG. 2.

Referring now to FIGS. 1 and 2, an hour meter is indicated generally by the reference character 10. The hour meter 10 comprises an integrally formed brass box-shaped case or housing 12 having a flanged windowed front wall 14 at one side and an open end 16 at the opposite side. An hour meter assembly 18 is received in the open end 16.

The hour meter assembly 18 includes a brass back wall 20 nested in the open end 16 of housing 12. A right angle lip 22 is formed along each side of the back wall 20 and a vibration damping pad 24 of Teflon is nested between the lips 22 of the back wall 20. The adjacent surfaces of housing 12 and wall 20 are conveniently brazed together, as seen at 21 in FIG. 7, to form an encircling hermetically sealed wall structure for the meter. It will be understood of course that the housing 12 and wall 20 comprise any materials which may be conveniently sealed together to prevent passage of atmosphere through the juncture, and that the hour meter, prior to said sealing, is filled with an inert gas as may be conveniently done for example in a glove box in which the sealing is completed.

The meter assembly 18 comprises a series of decimally marked, molded plastic odometer wheels 26, and respective molded plastic pinions 28 for conventionally transmitting in tandem movement of a respective lower digit order wheel to a respective higher digit order wheel at 1/10 the rate of the lower order wheel. Odometer wheels 26 are arranged along a horizontally aligned shaft 30 in increasing digit order from left to right, as seen in FIG. 2, and the pinions are arranged along parallel shaft 32. Wheels 26 are driven by an indicator wheel 34 at one end of shaft 30 through a respective one of pinions 28. Wheel 34 completes one revolution every 360 seconds and has ten graduations along its periphery for indicating thirty-six second intervals instead of the conventional peripheral numerals on the odometer wheels 26, which indicate 1/10, units, tens and hundreds of hours of operation respectively. The wheel 34, therefore, moves at an easily detected visual rate as compared with wheels 26 and comprises a molded wheel having a peripheral series of 48 teeth. The teeth of wheel 34 mesh with the teeth of a 20-tooth plastic transfer pinion 36 as seen in FIG. 3 and is driven thereby.

The shafts 30 and 32 are each supported in opposite side plates 38 and 40, which, together with an intermediate plate 42, are spaced and held together by three spacer assemblies 44, 46 and 48. The pinion 36 is carried by a cantilever shaft 50 supported in the plate 38 and it is coupled to a 10-tooth drive pinion 52. The drive pinion 52 is coaxially rotated by a 50-tooth drive wheel 54 on a shaft 56 journalled in plates 38 and 42. The drive wheel 54 is clutch-connected by means of a spring clutch 58 as seen in FIG. 4 to an inertial weight 60 rotatably carried by shaft 56. The inertial weight 60 is biased in one direction by a mainspring 62 and the drive wheel 54 is rotated by the mainspring 62 through the spring clutch 58.

The rotational speed or velocity of the drive wheel 54 is controlled by an idler pinion 64 and a coaxial idler wheel 66 mounted on a shaft 68. Wheel 66 meshes with an escape pinion 70 in turn controlled by a coaxial escape wheel 72 and both are mounted on a shaft 74. A conventional pallet fork 76 mounted on a shaft 78 is in turn controlled by a conventional hairspring and balance wheel assembly 80 mounted on shaft 82 and adjusted to operate at substantially 300 beats per minute. Shafts 56, 68, 74, 78 and 82 are each supported in plates 48 and 42 in parallel alignment to shafts 50, 30 and 32 to simplify the transmission of movement between the gears and odometer wheels, while the idler wheel 66 directly couples the escape wheel 72 to the drive wheel 54 for reducing the power required of the mainspring.

Figure 5:
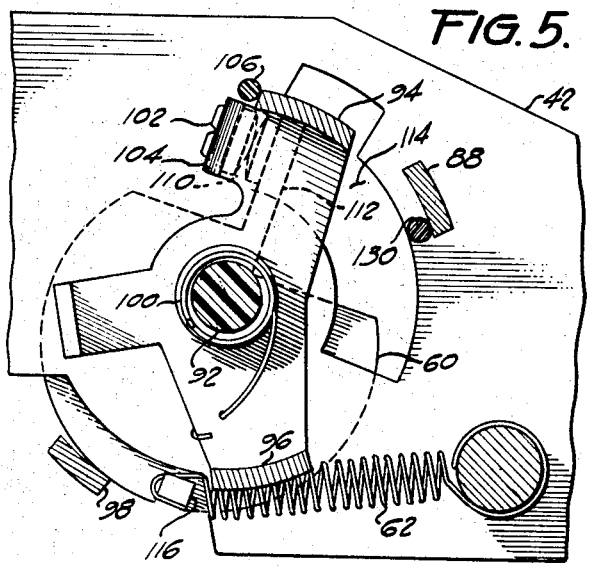
FIG. 5 is a sectional view taken generally along the line 5—5 in FIG. 4.

The plate 40 carries an electromagnet 84 with the core of the magnet 84 formed by an integral segment 86 of plate 40. The segment is bent from the plate at a right angle thereto and protrudes from one end of the magnet to form an arcuate pole piece 88 for an armature 90, best seen in FIGS. 4 and 5.

The armature 90 is carried on a shaft 92 of insulating material pivotally supported between plates 40 and 42 in parallel alignment with the other shafts. One arm 94 on armature 90 is attracted to pole piece 88 and rotates into a position adjacent thereto on energization of magnet 84 and another arm 96 on armature 90 simultaneously rotates into a position of alignment with a second arcuate pole piece 98 formed from an integral right angle segment of plate 40. The armature 90 does not actually engage the pole pieces and therefore the noise and shock of metal contact is avoided. The armature 90 and shaft 92 are biased in one direction by a helical spring 100, which also serves to electrically connect a contact 102 carried by an arm 104 of the armature 90 to one terminal of magnet 84. An insulating stop 106 on an end flange 108 of magnet 84 serves to limit movement of the armature under the influence of spring 100.

The contact 102 is engaged by a grounded contact 110 for energizing magnet 84 when the mainspring 62 has driven the inertial weight 60 to one limit position. The contact 110 is carried by an arm 112 of the inertial weight. The arm 112 extends through an arcuate opening 114 in plate 42 to permit the arm 94 and weight 60 to be rotated for winding or tensing the mainspring 62 on rotation of the armature 90 by magnet 84. The mainspring 62 has one end connected in a recess on spacer assembly 48 and the other end connected to an arm 116 of the inertial weight 60. The arm 116 extends through an arcuate recess in plate 42 so that it may rotate freely as the weight 60 is rotated by the armature 90.

Figure 7:
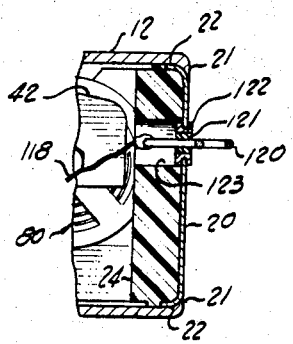
FIG. 7 is a sectional view taken generally along the line 7—7 in FIG. 1.

A lead 118 is connected from magnet 84 to a terminal 120 for energizing the magnet 84 in response to the closure of contacts 102 and 110. The terminal 120 comprises a simple wire hook for extending an external electrical connection and it passes through a standard sealed glass insulator 121 sealed to a metal grommet 122 located in an opening in wall 22. The grommet 122 in turn is soldered to the wall 20 to seal the opening therein. Damping pad 24 as seen in FIG. 7 has a passageway 123 which permits lead 118 to connect to terminal 120. Another terminal 124, which likewise passes through a sealed glass insulator having a grommet soldered in an opening in wall 22, permits a ground connection to be established from an outside power source over a lead 126 passing through an opening in the pad 24 to the plate 40 and thereby the inertial weight 60 and contact 110.

On engagement of contacts 102 and 110, in response to the unwinding of the mainspring 62 for driving wheels 54, 52, 36, 34 and 26, a circuit is completed to the magnet 84 through terminals 120 and 124. Magnet 84 energizes to attract the armature 90. The arms 94 and 96 of armature 90 swing into alignment with the pole pieces simultaneously rotating the inertial weight 60 and winding the mainspring 62 until the armature arm 94 engages a second stop 130 of insulating material carried on the end flange 108 of magnet 84. The inertial weight 60 of course continues to move slightly against the bias of spring 62 and opens the contacts 102 and 110 to deenergize the magnet. The armature 90 now returns to normal under the influence of spring 100, while the spring 62 drives the inertial weight 60 and hour meter wheels until the contacts 102 and 110 again engage to reenergize the magnet.

Figure 6:
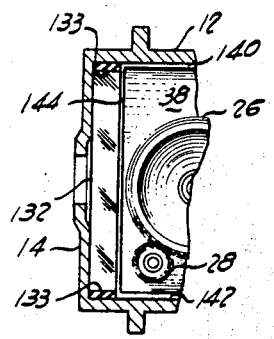
FIG. 6 is a sectional view taken generally along the line 6—6 in FIG. 2.

The odometer wheels 26 and wheel 34 are viewed through the windowed front wall 14 of the housing 12. As seen in FIGS. 1 and 6, a lens 132 is located directly behind wall 14 and a platinum coating 133 along the periphery or rim of the lens is soldered to housing 12 to seal the lens in the opening in wall 14. Apertured end flanges 134 on wall 14 of course permit the meter 10 to be mounted on a suitable support or panel.

In addition, a pair of vibration damping and electrically insulating caps 136 and 138 of Teflon are provided for supporting the assembly 18 in the housing 12. The caps 136 and 138 are each formed with opposite side lips 140 and 142 and an end lip 144 for nesting engagement against respective surfaces of plates 38 and 40 respectively. The lips 140, 142 and 144 position the caps to facilitate assembly of the plates and caps to housing 12 while supporting the respective plates in the housing 12. Cutout portions 146 and 148 in each cap permit the respective ends of the screws of the spacer assemblies 44, 46 and 48 of the shafts to protrude slightly, while the surfaces of the caps snugly engage between the plates 38 and 40 and the respective internal surfaces of the walls of housing 12.

The hour meter assembly 18 is also supported in housing 12 by a peripheral ridge 150 of the damping pad 24 with the ridge extending slightly beyond the confines of the plates 38 and 40. The ridge also butts the end of plates 38 and 40 and aids in locating the back wall during assembly. The pad 24 is also provided with spaced prongs 152 at opposite sides so it can be snap-fitted in appropriate openings in the plates 38 and 40 to properly locate the back wall relative the housing 12 on insertion of the plates 38 and 40 to their limit position in the housing.

The foregoing constitutes a description of an improved hour meter whose inventive concepts are believed set forth more explicitly in the accompanying claims.

What is claimed is:

1. An hour meter comprising a series of odometer wheels, a clock mechanism for driving said odometer wheels to indicate elapsed time, a pair of spaced side plates supporting said wheels and mechanism, a housing having a windowed wall at one side and an open end at the other side, a lens sealing ly engaged against the window of said wall to enable viewing of said wheels and preventing the passage of atmosphere through said window into said housing, a back wall in sealed engagement with the walls of said housing adjacent said open end to prevent the passage of atmosphere through said open end, electrically operable means supported on one of said side plates for driving said clock mechanism in response to the extension of an electrical circuit to said electrically operable means, and means passing through said back wall in sealed relationship to said back wall for extending an electrical circuit from the exterior of said housing to said electrically operable means to operate said electrically operable means for driving said clock mechanism.

2. An hour meter comprising a series of odometer wheels, a clock mechanism for driving said odometer wheels to indicate elapsed time, a pair of spaced side plates supporting said wheels and mechanism, a housing having a windowed wall at one side and an open end as the other side, a lens sealingly engaged against the window of said wall to enable viewing of said wheels and preventing the passage of atmosphere, a damping pad secured between said plates adjacent one end thereof and having a peripheral ridge for engagement with the internal surface of said housing to resiliently support said plates in said housing, and a back wall carried by said damping pad for sealing engagement with the walls of said housing adjacent said open end.

3. An hour meter comprising a series of odometer wheels, a clock mechanism for driving said odometer wheels to indicate elapsed time, a pair of spaced side plates supporting said wheels and mechanism, a box-shaped housing having a windowed wall at one side and an open end at the other side, a lens sealingly engaged against the window of said wall to enable viewing of said wheels and prevent the passage of atmosphere, a damping pad secured between said plates adjacent one end thereof and having a peripheral ridge for engagement with the internal surface of said housing to resiliently support said plates in said housing, a back wall carried by said damping pad for sealing engagement with the walls of said housing adjacent said open end, and a damping cap for each plate with each cap having top and bottom lips and an end lip to permit positioning of said caps on the respective plate and for supporting the respective plate in said housing.

4. An hour meter comprising a series of odometer wheels, a clock mechanism for driving said odometer wheels to indicate elapsed time, a pair of spaced parallel side plates supporting said wheels and mechanism, a box-shaped housing having a window at one side and an open end at the other side, a lens sealingly engaged in said window to enable viewing of said wheels and preventing the passage of atmosphere, a damping pad secured between said plates adjacent one end thereof, a back wall carried by said damping pad for sealing engagement with the walls of said housing adjacent said open end, and a vibration damping cap for each side plate engaged between said side plates and the walls of said housing for resiliently supporting said plates in said housing.

5. An hour meter comprising a series of odometer wheels, a clock mechanism having a mainspring for driving said odometer wheels to indicate elapsed time, a pair of spaced parallel side plates supporting said wheels, a box-shaped housing having a window at one side an an open end at the other side, a lens sealingly engaged against said window and enabling viewing of said wheels through said window while preventing the passage of atmosphere into said housing, a damping pad secured between said plates adjacent one end thereof and having a peripheral ridge for engagement with the internal surface of said housing to resiliently support said plates in said housing, a back wall carried by said damping pad for sealing engagement with the walls of said housing adjacent said open end, a vibration damping cap for each side plate engaged between said side plates and respective walls of said housing for supporting said plates in said housing, a pair of integrally formed segments on one of said plates extending toward the other plate, an electromagnet carried by one of said segments, and a pivotally carried armature attracted to said segments for winding said mainspring on energization of said magnet.

6. An hour meter comprising a series of odometer wheels, a clock mechanism having a mainspring for driving said odometer wheels to indicate elapsed time, a pair of spaced parallel side plates supporting said wheels for rotation about one axis, a box-shaped housing having a window at one side and an open end at the other side, a lens sealingly engaged against said window and enabling viewing of said wheels through said window while preventing the passage of atmosphere into said housing, a damping pad secured between said plates adjacent one end thereof with spaced passageways in said pad and a peripheral ridge for engagement with the internal surface of said housing to resiliently support said plates in said housing, a back wall carried by said damping pad for sealing engagement with the walls of said housing adjacent said open end, a vibration damping cap for each side plate engaged between said side plates and respective walls of said housing for supporting said plates in said housing, a pair of integrally formed segments on one of said plates extending toward the other plate, an electromagnet carried by one of said segments, a pivotally carried armature attracted to said segments for winding said main spring on energization of said magnet, and a pair of leads electrically extended through respective sealed apertures in said back wall and said pad passageways for enabling energization of said magnet.

7. In the hour meter claimed in claim 6, a drive wheel operated by said mainspring for rotation about an axis parallel to said one axis, and a transfer pinion rotated about an axis parallel to said one axis for transferring movement directly between said drive wheel and odometer wheels.

8. An hour meter comprising a plurality of odometer wheels rotatable in tandem about one horizontal axis for indicating hours of machine operation in decimal values, a mainspring, a drive wheel operated by said mainspring about a second axis parallel to said one axis for rotating said odometer wheels, a transfer pinion rotatable by said drive wheel about an axis parallel to said one and second axis and coupled to one of said odometer wheels for rotating said odometer wheel, a hermetically sealed wall structure for said meter having a sealed lens for viewing said odometer wheels, and vibration damping means supporting said hour meter in said wall structure.

9. An hour meter comprising a series of odometer wheels, a clock mechanism having a mainspring for driving said odometer wheels to indicate elapsed time, a pair of spaced side plates supporting said wheels and mechanism, an electromagnet, an armature for said electromagnet arranged to wind said spring on movement in one direction, and a pair of spaced integrally formed segments on one of said plates each projecting perpendicularly from said one plate and extending toward the opposite plate with one of said segments carrying said magnet and both said segments serving as pole pieces for said magnet to attract said armature in said one direction on energization of said magnet.

References Cited

UNITED STATES PATENTS 1,284,418   11/1918   Montaney _____ 58—22.9

FOREIGN PATENTS 708,061   4/1965   Canada.

RICHARD B. WILKINSON, *Primary Examiner.*

EDITH C. SIMMONS, *Assistant Examiner.*

U.S. Cl. X.R.

58—23, 55